US012497106B2

(12) United States Patent
Kataria et al.

(10) Patent No.: US 12,497,106 B2
(45) Date of Patent: Dec. 16, 2025

(54) MODULAR MAIN FRAME FOR WORK VEHICLE

(71) Applicant: Komatsu America Corp., Chicago, IL (US)

(72) Inventors: Vikas Kataria, Dunlap, IL (US); Jeffrey Arnold Seiwell, Dunlap, IL (US); Dhavalkumar B. Dalsaniya, Peoria, IL (US)

(73) Assignee: KOMATSU AMERICA CORP., Chicago, IL (US)

( * ) Notice: Subject to any disclaimer, the term of this patent is extended or adjusted under 35 U.S.C. 154(b) by 505 days.

(21) Appl. No.: 17/901,385

(22) Filed: Sep. 1, 2022

(65) Prior Publication Data

US 2023/0072758 A1    Mar. 9, 2023

Related U.S. Application Data

(60) Provisional application No. 63/240,043, filed on Sep. 2, 2021.

(51) Int. Cl.
| | | |
|---|---|---|
| *B62D 21/00* | (2006.01) | |
| *B60K 6/20* | (2007.10) | |
| *B62D 21/11* | (2006.01) | |
| *B62D 21/18* | (2006.01) | |
| *B62D 65/10* | (2006.01) | |

(52) U.S. Cl.
CPC .............. *B62D 21/186* (2013.01); *B60K 6/20* (2013.01); *B62D 21/11* (2013.01); *B62D 65/10* (2013.01)

(58) Field of Classification Search
CPC ...... B62D 21/186; B62D 21/11; B62D 65/10; B60K 6/20

USPC .......................................................... 180/291
See application file for complete search history.

(56) References Cited

U.S. PATENT DOCUMENTS

| | | | |
|---|---|---|---|
| 3,497,027 A | 2/1970 | Wild | |
| 6,390,215 B1 | 5/2002 | Kodama et al. | |
| 9,234,472 B2 * | 1/2016 | Kim | F02D 41/0025 |
| 9,500,124 B2 * | 11/2016 | Ge | F02B 37/12 |
| 9,937,781 B1 * | 4/2018 | Bryer | B62D 35/02 |
| 10,286,787 B2 * | 5/2019 | Mazumdar | B60L 50/40 |
| 10,668,830 B2 * | 6/2020 | Huff | B60K 1/04 |
| 12,151,922 B2 * | 11/2024 | Zahdeh | B66F 9/07559 |
| 12,269,538 B2 * | 4/2025 | Roche | B60K 17/22 |
| 2001/0052433 A1 | 12/2001 | Harris et al. | |
| 2006/0118349 A1 * | 6/2006 | LeBlanc, Sr. | B60K 17/36 |
| | | | 180/312 |
| 2007/0199746 A1 | 8/2007 | Reid et al. | |
| 2010/0065344 A1 | 3/2010 | Collings, III | |

(Continued)

FOREIGN PATENT DOCUMENTS

WO          9954158 A1     10/1999

*Primary Examiner* — James A Shriver, II
*Assistant Examiner* — Hilary L Johns
(74) *Attorney, Agent, or Firm* — GLOBAL IP COUNSELORS, LLP

(57) ABSTRACT

A work vehicle includes a main frame. The main frame is configured to selectively receive one of a first type of power source and a second type of power source. The first type of power source is different from the second type of power source. A traction motor is connected to the main frame and is configured to be driven by the one of the first type of power source and the second type of power source. A wheel is connected to the main frame and is configured to be driven by the traction motor.

25 Claims, 15 Drawing Sheets

(56) References Cited

U.S. PATENT DOCUMENTS

| | | | |
|---|---|---|---|
| 2013/0306394 A1* | 11/2013 | Theodore | B60K 6/40 |
| | | | 280/798 |
| 2014/0375272 A1 | 12/2014 | Johnsen et al. | |
| 2015/0042157 A1 | 2/2015 | Chen et al. | |
| 2020/0317082 A1 | 10/2020 | Huff et al. | |
| 2021/0078414 A1* | 3/2021 | Ajisaka | B60L 50/71 |
| 2022/0194489 A1* | 6/2022 | Roche | A61G 3/061 |
| 2022/0402736 A1* | 12/2022 | Zahdeh | G05D 1/65 |
| 2023/0072758 A1* | 3/2023 | Kataria | B62D 65/10 |

* cited by examiner

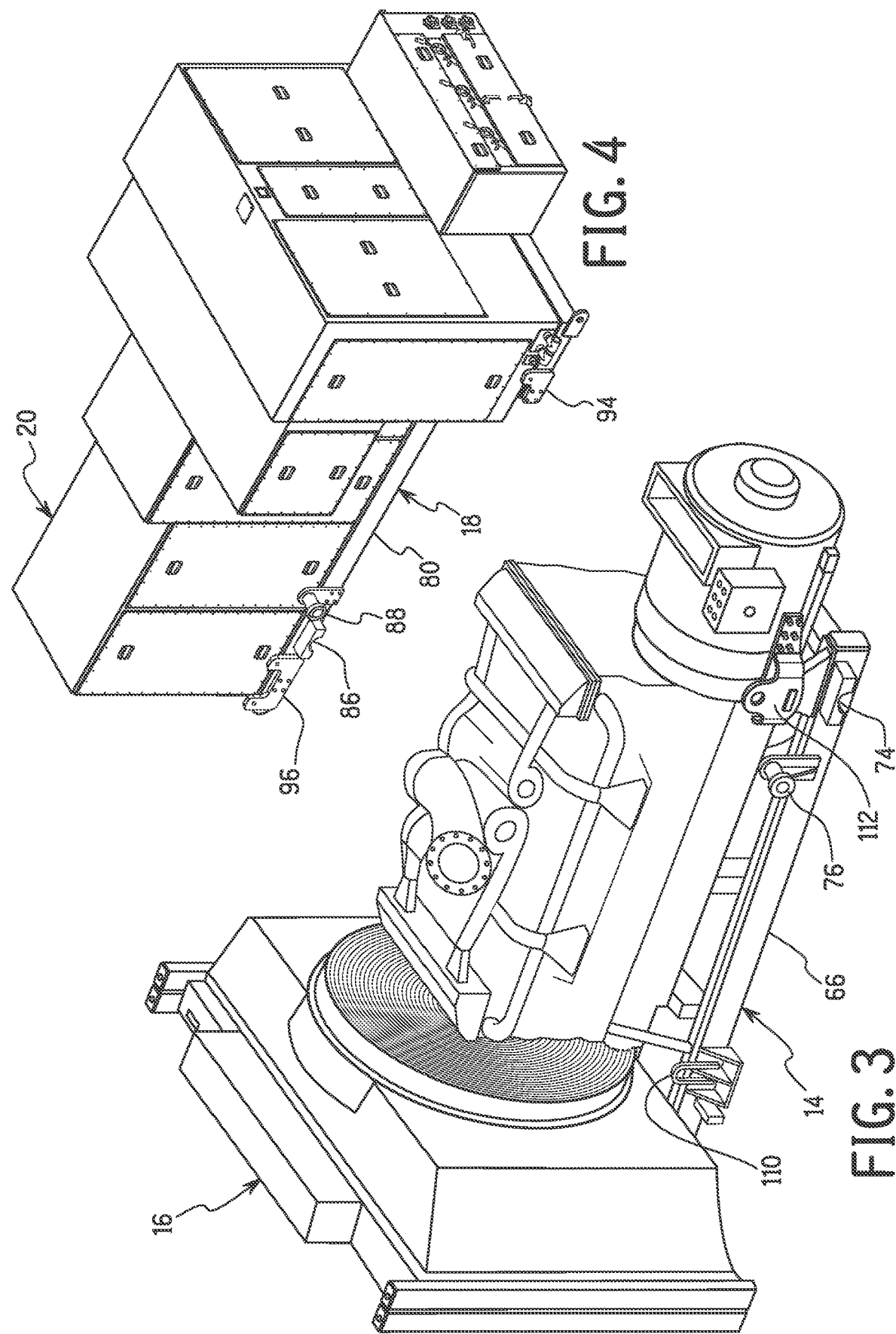

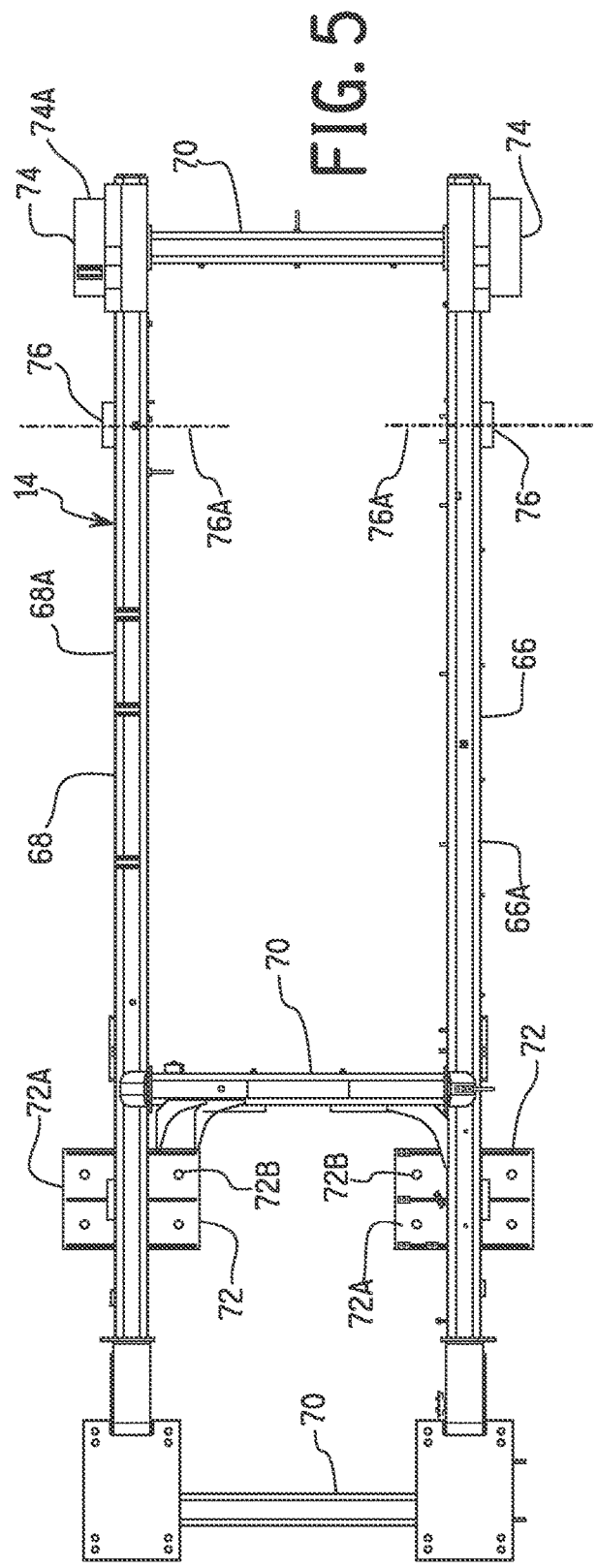
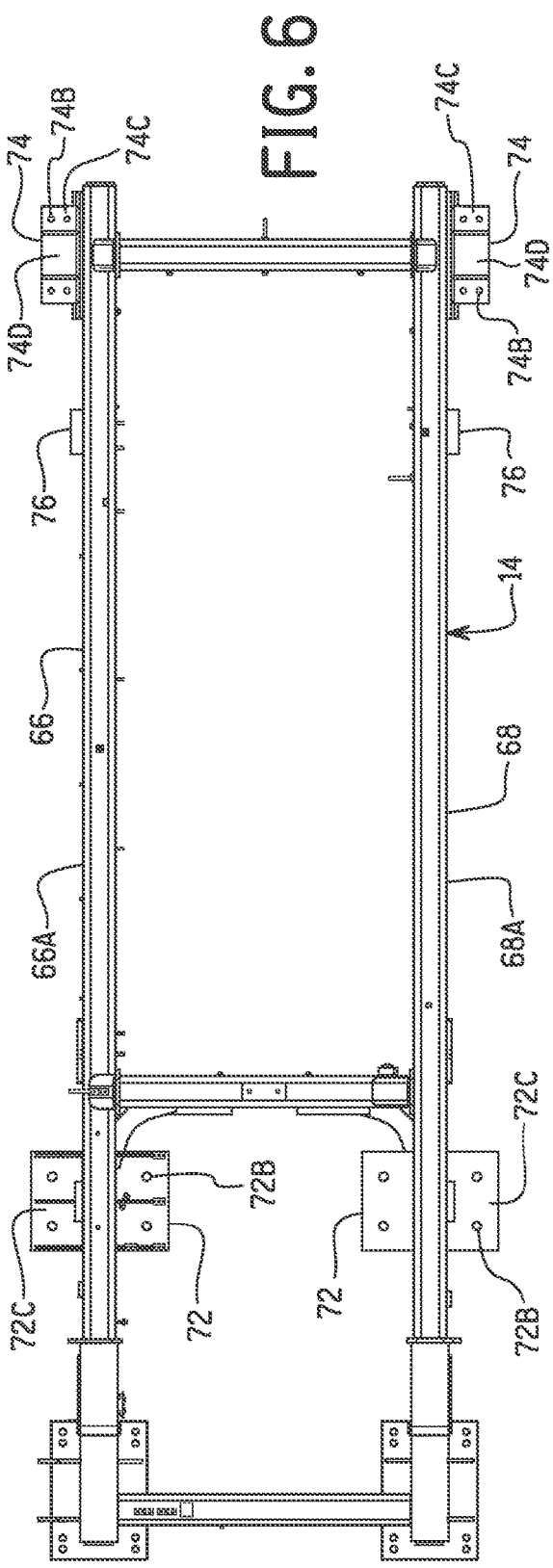

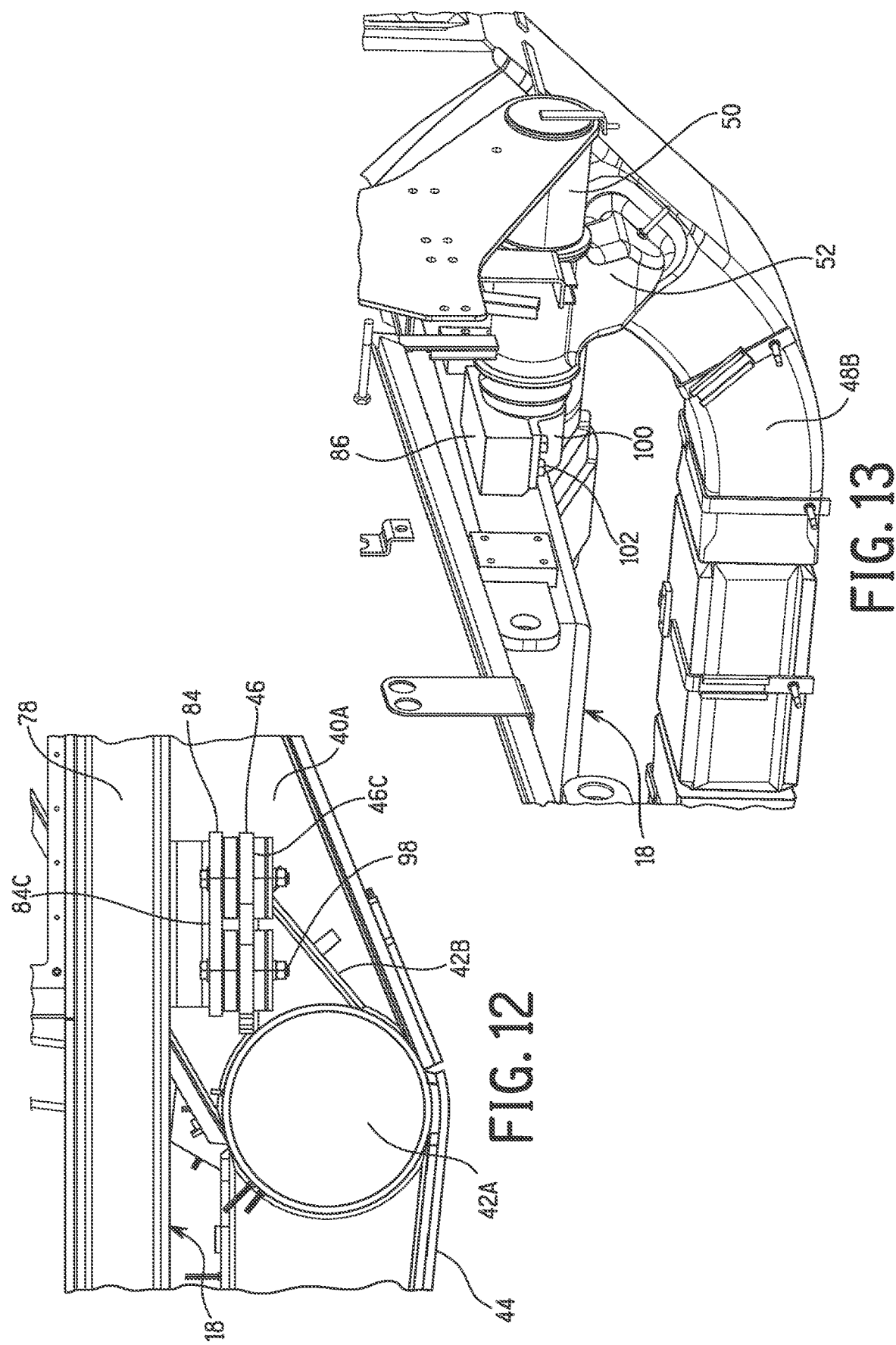

MODULAR MAIN FRAME FOR WORK VEHICLE

CROSS REFERENCE TO RELATED APPLICATIONS

This application claims the benefit under 35 U.S.C. § 119(e) of U.S. Provisional Application No. 63/240,043, filed Sep. 2, 2021. The entire disclosure of U.S. Provisional Application No. 63/240,043 is hereby incorporated herein by reference.

BACKGROUND

Field of the Disclosure

The present disclosure generally relates to a modular main frame for a work vehicle. More specifically, the present disclosure relates to a main frame of a work vehicle to which one of a first type of power source and a second type of power source is selectively mounted.

Background Information

A work vehicle is used in off-road applications, such as construction, mining and the like. Conventional work vehicles are manufactured with a single type of power source, such as a diesel engine, natural gas engine, battery, trolley, hydrogen fuel cell, and hybrids thereof.

SUMMARY

A need exists for a main frame of a work vehicle to which one of a first type of power source and a second type of power source is selectively mounted in which the first type of power source is different from the second type of power source.

In view of the state of the known technology and in accordance with a first aspect of the present disclosure, a work vehicle is basically provided that includes a main frame. The main frame is configured to selectively receive one of a first type of power source and a second type of power source. The first type of power source is different from the second type of power source. A traction motor is connected to the main frame and is configured to be driven by the one of the first type of power source and the second type of power source. A wheel is connected to the main frame and is configured to be driven by the traction motor.

In accordance with a second aspect of the present disclosure, the work vehicle according to the first aspect is configured so that the second type of power source is configured to be mounted to the main frame after removing the first type of power source.

In accordance with a third aspect of the present disclosure, the work vehicle according to the first aspect is configured so that a first type of power source is mounted on a first sub-frame, and the second power source is mounted on a second sub-frame. The first sub-frame and the second sub-frame are configured to be mounted to the main frame.

In accordance with a fourth aspect of the present disclosure, the work vehicle according to the third aspect is configured so that a roller member is removably attached to the one of the first sub-frame and the second sub-frame.

In accordance with a fifth aspect of the present disclosure, the work vehicle according to the fourth aspect is configured so that the roller member is configured to move between a first position and a second position on a mounting rail connected to the main frame.

In accordance with a sixth aspect of the present disclosure, the work vehicle according to the fifth aspect is configured so that a stop member is disposed at the second position on the mounting rail to limit further movement of the roller member in a direction away from the first position.

In accordance with a seventh aspect of the present disclosure, the work vehicle according to the sixth aspect is configured so that a first mount connected to the main frame is spaced from a first mount connected to the one of the first sub-frame and the second sub-frame when the roller member is disposed in the second position.

In accordance with an eighth aspect of the present disclosure, the work vehicle according to the seventh aspect is configured so that a second mount connected to the main frame is spaced from a second mount connected to the one of the first sub-frame and the second sub-frame when the roller member is disposed in the second position.

In accordance with a ninth aspect of the present disclosure, the work vehicle according to the eighth aspect is configured so that the first mount of the main frame is disposed forward of the first position of the mounting rail.

In accordance with a tenth aspect of the present disclosure, the work vehicle according to the ninth aspect is configured so that the second mount of the main frame is disposed rearward of the second position of the mounting rail.

In accordance with an eleventh aspect of the present disclosure, the work vehicle according to the first aspect is configured so that the first type of power source is an engine.

In accordance with a twelfth aspect of the present disclosure, the work vehicle according to the first aspect is configured so that the second type of power source is a battery.

In accordance with a thirteenth aspect of the present disclosure, the work vehicle according to the first aspect is configured so that the second type of power source is a hydrogen fuel cell.

In accordance with a fourteenth aspect of the present disclosure, the work vehicle according to the first aspect is configured so that the main frame is configured to selectively receive one of a first type of power source accessory and a second type of power source accessory to provide power to the one of the first type of power source and the second type of power source, respectively. The first type of power source accessory is different from the second type of power source accessory.

In accordance with a fifteenth aspect of the present disclosure, the work vehicle according to the fourteenth aspect is configured so that a third mount connected to the main frame is configured to receive the one of the first power source accessory and the second power source accessory.

In accordance with a sixteenth aspect of the present disclosure, the work vehicle according to the fifteenth aspect is configured so that a fourth mount connected to the main frame is configured to receive the one of the first type of power source accessory and the second type of power source accessory.

In view of the state of the known technology and in accordance with a seventeenth aspect of the present disclosure, a method of assembling a work machine is basically provided that includes mounting a first type of power source is mounted to a main frame of the work vehicle, removing the first type of power source from the main frame of the work vehicle, and mounting a second type of the power source to the main frame of the work vehicle. The first type of power source is different from the second type of power source.

In accordance with an eighteenth aspect of the present disclosure, the method according to the seventeenth aspect is configured so that the first type of power source is mounted on a first sub-frame, and the second type of power source is mounted on a second sub-frame. The first sub-frame and the second sub-frame are configured to be mounted to the main frame.

In accordance with a nineteenth aspect of the present disclosure, the method according to the eighteenth aspect further includes disposing a roller of the one of the first sub-frame and the second sub-frame at a first position of a mounting rail connected to the main frame, and moving the one of the first sub-frame and the second sub-frame to a second position of the mounting rail.

In accordance with a twentieth aspect of the present disclosure, the method according to the eighteenth aspect further includes stopping further movement of the one of the first sub-frame and the second sub-frame in a direction away from the first position with a stop member.

In accordance with a twenty-first aspect of the present disclosure, the method according to the nineteenth aspect further includes removing the roller from the one of the first sub-frame and the second sub-frame, and lowering the one of the first sub-frame and the second sub-frame to engage a first mount of the one of the first sub-frame and the second sub-frame with a first mount of the main frame.

In accordance with a twenty-second aspect of the present disclosure, the method according to the twenty-first aspect further includes engaging a second mount of the one of the first sub-frame and the second sub-frame with a second mount of the main frame. The second mount of the main frame is disposed rearward of the first mount of the main frame in a longitudinal direction of the main frame.

In accordance with a twenty-third aspect of the present disclosure, the method according to the eighteenth aspect further includes selectively mounting one of a first type of power source accessory and a second type of power source accessory to provide power to the one of the first type of power source and the second type of power source. The first type of power source accessory is different from the second type of power source accessory.

In accordance with a twenty-fourth aspect of the present disclosure, the method according to the twenty-second aspect further includes removing the one of the first sub-frame and the second sub-frame, and mounting the other of the first sub-frame and the second sub-frame to the main frame.

In view of the state of the known technology and in accordance with a twenty-fifth aspect of the present disclosure, a main frame for a work vehicle is basically provided that includes a first longitudinally extending member, a second longitudinally extending member, and a plurality of cross members extending between the first and second longitudinally extending members. A first mount is connected to one of the plurality of cross members. A second mount is connected to one of the plurality of cross members. The first and second mounted are configured to selectively receive a sub-frame on which a power source is mounted.

Also, other objects, features, aspects and advantages of the disclosed work vehicle will become apparent to those skilled in the art from the following detailed description, which, taken in conjunction with the annexed drawings, discloses an embodiment of the work vehicle.

BRIEF DESCRIPTION OF THE DRAWINGS

Referring now to the attached drawings which form a part of this original disclosure:

FIG. 3 is a perspective view of an engine mounted to an engine sub-frame;

FIG. 4 is a perspective view of a battery mounted to a battery sub-frame;

FIG. 5 is a top plan view of the engine sub-frame of FIG. 3;

FIG. 6 is a bottom plan view of the engine sub-frame of FIG. 3;

FIG. 12 is a side elevational view of the battery sub-frame of the second power source mounted to a front mount of the main frame of FIG. 11;

FIG. 13 is a perspective view of the battery sub-frame of the battery mounted to a rear mount of the main frame of FIG. 11;

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the disclosure as defined by the appended claims and their equivalents.

Figure 1:
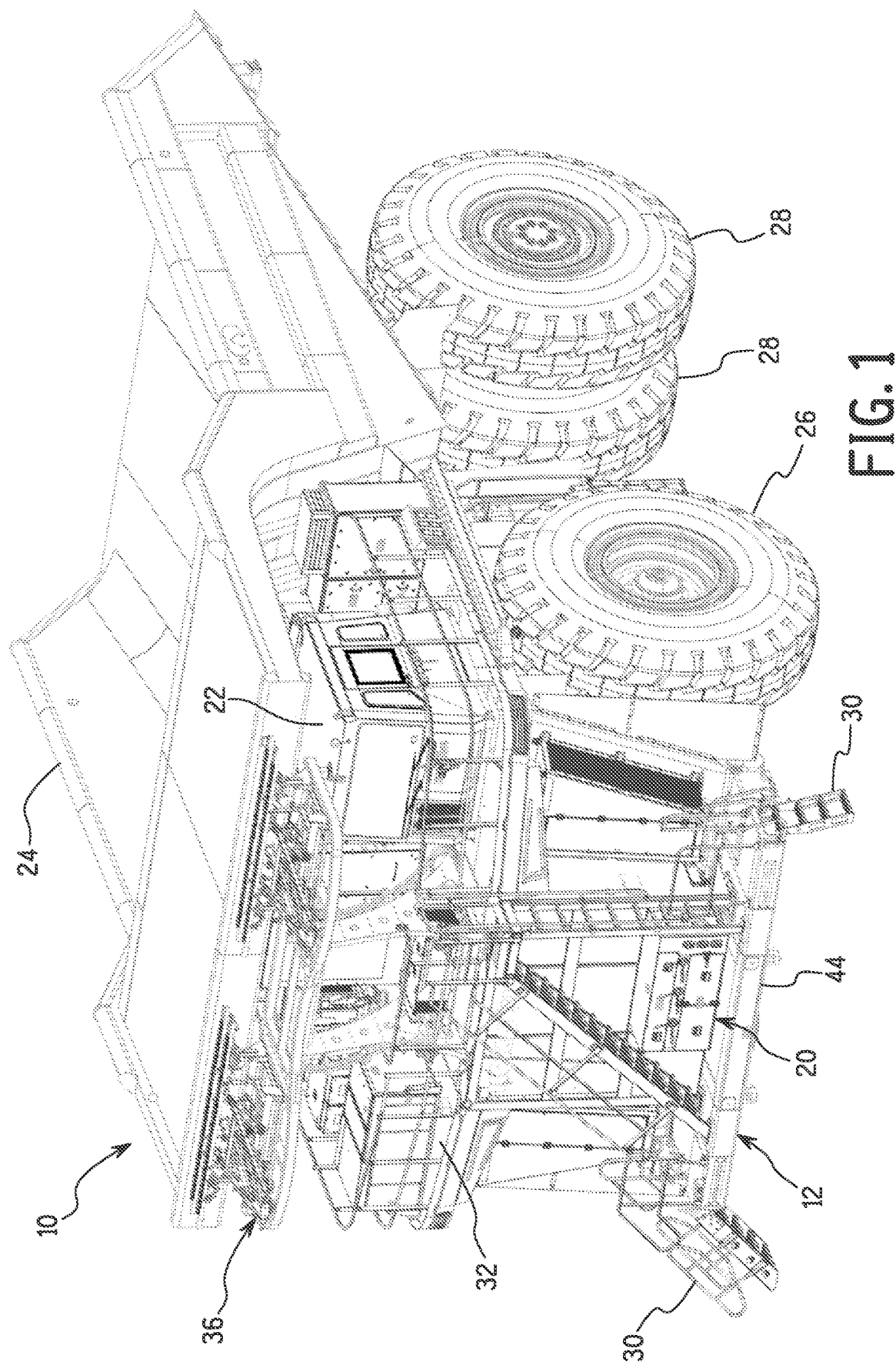
FIG. 1 is a perspective view of a work vehicle in accordance with an exemplary embodiment of the present disclosure.

Referring initially to FIGS. 1, 2, 9 and 10, a work vehicle 10 is illustrated in accordance with an exemplary embodiment of the present disclosure. The work vehicle 10 includes a main frame 12 configured to selectively receive one of a first sub-frame on which a first type of power source is mounted and a second sub-frame on which a second type of power source is mounted. The first type of power source is different from the second type of power source. As shown in FIG. 1, a battery 20 is selectively mounted to the main frame 12 of the work vehicle 10. The battery 20 can be the first type of power source and the second type of power source. Although the work vehicle 10 is illustrated as a mining truck, the work vehicle can be any vehicle having a main frame to which a sub-frame including a power source is mounted.

The work vehicle 10 includes a cab 22 from which a driver operates the work vehicle, as shown in FIG. 1. The cab 22 is installed at an upper left, front part of the main frame 12. A dump body 24 that carries loads, such as mined rocks and stones, earth and sand, is movably connected to an upper rear part of the main frame 12. The dump body 24 is moved by extensions and contractions of a cylinder (not shown).

A plurality of wheels 26 and 28 are rotatably connected to the main frame 12, as shown in FIG. 1. A front wheel 26 is disposed on each of the front-right and front-left sides of the work vehicle 10. A pair of rear wheels 28 is disposed on each of the rear-right and rear-left sides of the work vehicle 10. A traction motor 29 is connected to the main frame 12 and is configured to be driven by the power source. At least the rear wheels 28 are driven by a driving force supplied from the traction motor 29. The plurality of wheels 26 and 28 are rotatably connected to the main frame in a conventional manner.

A plurality of ladders 30 is provided on the front-right and the front-left sides of the main frame 12 to provide access to areas of the work vehicle 10, such as the cab 22, as shown in FIG. 1. A platform 32 surrounds the cab 22 and provides access to equipment disposed thereon. A handrail 34 is provided to an outer perimeter of the platform 32.

The work vehicle 10 can be equipped with a trolley line accessing system 36 configured to operate the work vehicle 10 via electrical power from an overhead trolley line when available. The work vehicle 10 can transition between an on-trolley mode where power is received from an overhead trolley line and an off-trolley mode where power is received from the work vehicle power source. The trolley line accessing system 36 is movable between a collapsed position, as shown in FIG. 1, when an overhead trolly line is not available and an extended position (not shown) in which the trolley line accessing system 36 is raised to contact an overhead trolley line.

Figure 2:
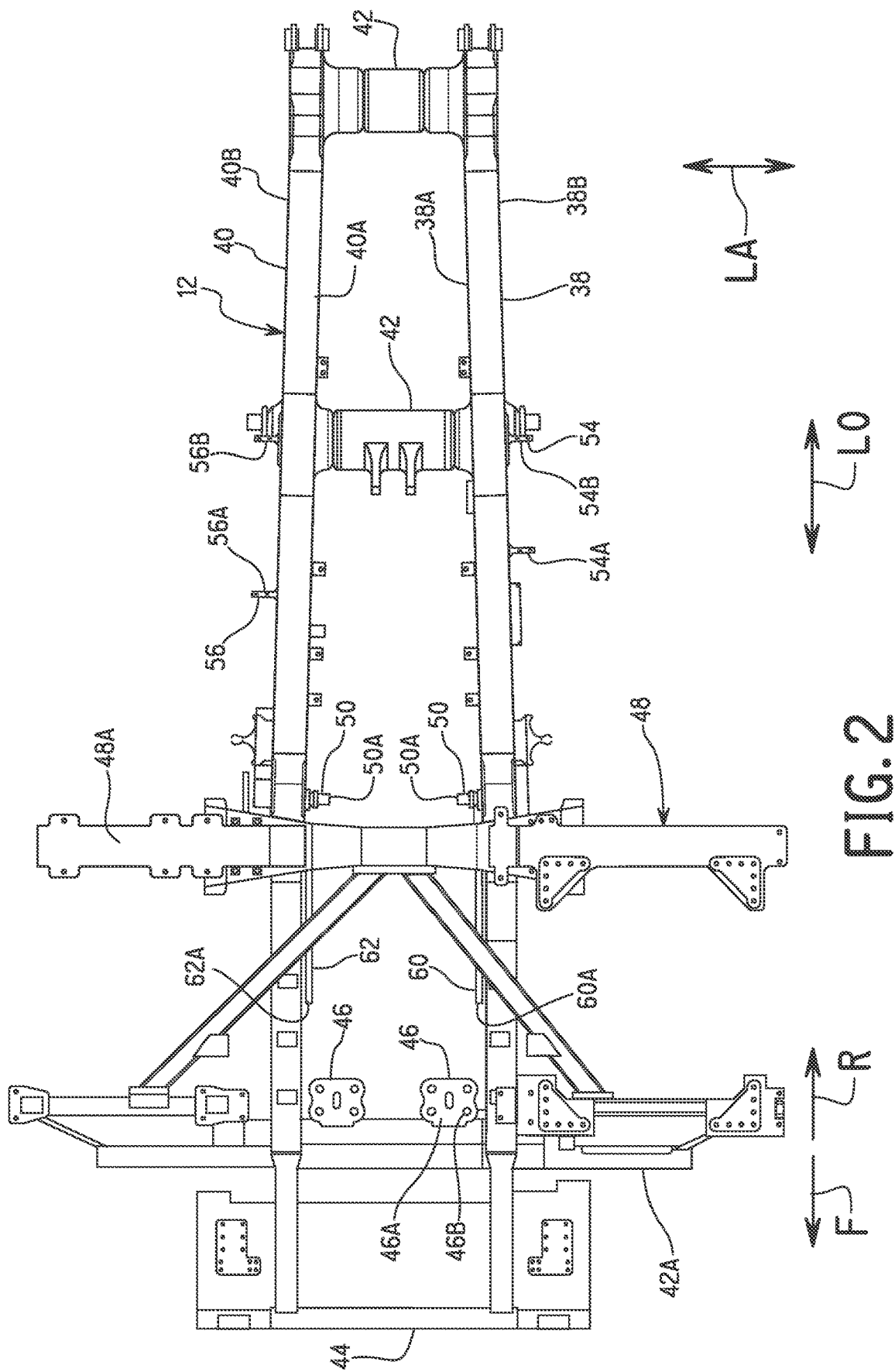
FIG. 2 is a top plan view of the main frame of the work vehicle of FIG. 1.

The work vehicle 10 includes a main frame 12, as shown in FIGS. 1 and 2. The main frame 12 includes a first longitudinally extending member 38 and a second longitudinally extending member 40. The first and second longitudinally extending members 38 and 40 extend in a longitudinal direction LO of the work vehicle. A plurality of cross members 42 extend between inner surfaces 38A and 40A of the first and second longitudinally extending members 38 and 40. The cross members 42 extend in a lateral direction LA of the work vehicle. A front bumper assembly 44 is rigidly connected to a forward-most cross member 42A of the work vehicle 10, as shown in FIG. 1, and extends from the forward-most cross member 42A in a forward direction F of the work vehicle 10.

A first mount 46 is connected to one of the cross members 42 of the main frame 12, as shown in FIG. 2. Preferably, the first mount 46 is connected to the forward-most cross member 42A in the forward direction F of the work vehicle 10. Two first mounts 46 are preferably connected to the forward-most cross member 42A. One of the first mounts 46 is disposed proximate the inner surface 38A of the first longitudinally extending member 38. The other of the first mounts 46 is disposed proximate the inner surface 40A of the second longitudinally extending member 40. Each of the first mounts 46 is substantially identical. An upper surface 46A of the first mount 46 is substantially planar. A plurality of fastener openings 46B extend from the upper surface 46A to a lower surface 46C (FIG. 12) of the first mount 46. A rearwardly extending rib 42B rigidly connects the first mount 46 to the cross-member 42A, as shown in FIGS. 11 and 12.

A support member 48 is rigidly connected to the main frame 12, as shown in FIGS. 2 and 9-11. The support member 48 includes an upper portion 48A and a lower portion 48B. The upper and lower support members 48A and 48B define an opening 48C configured to receive the sub-frame and the power source selectively mounted to the main frame 12.

Figure 11:
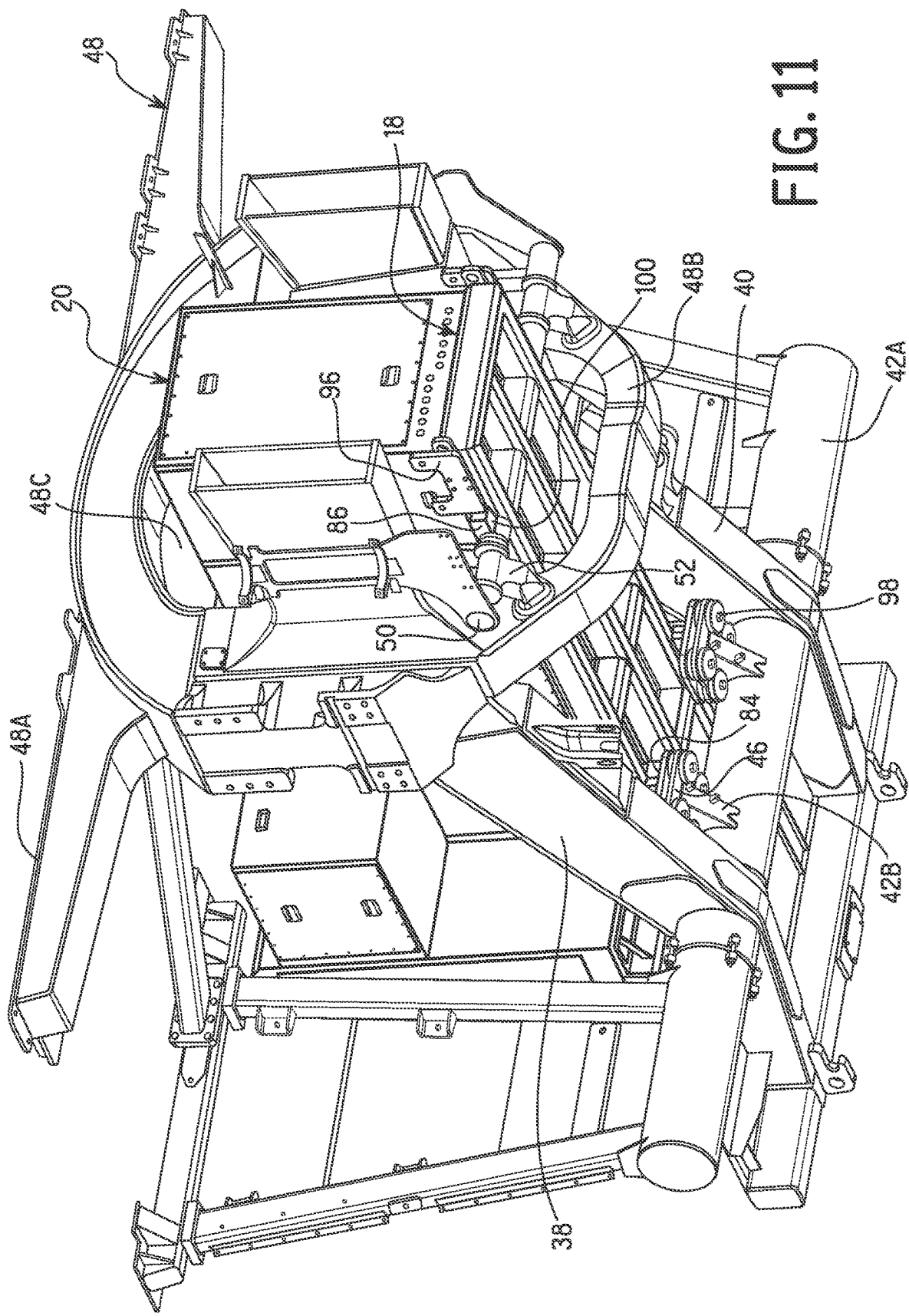
FIG. 11 is a lower perspective view of the battery mounted to the main frame of FIG. 10.

A second mount 50 is rigidly connected to the support member 48 of the main frame 12, as shown in FIGS. 2, 11 and 12. A support arm 52 extends rearwardly from the lower support member 48B, as shown in FIGS. 11 and 12. The second mount 50 is supported by the support arm 52 and extends in a lateral direction of the work vehicle. As shown in FIG. 11, the second mount 50 is a substantially circular member when viewed in the lateral direction of the work vehicle. An end 50A of the second mount 50 is disposed inwardly of the inner surface 38A of the first longitudinally extending member 38, as shown in FIG. 2. Preferably, two second mounts 50 are connected to the main frame 12. The second mounts 50 are preferably substantially similarly configured. An end 50A of the other second mount 50 is disposed inwardly of the inner surface 40A of the second longitudinally extending member 40 of the main frame 12. The second mounts 50 are disposed in a rearward direction R of the work vehicle 10 with respect to the first mounts 46.

Figure 10:
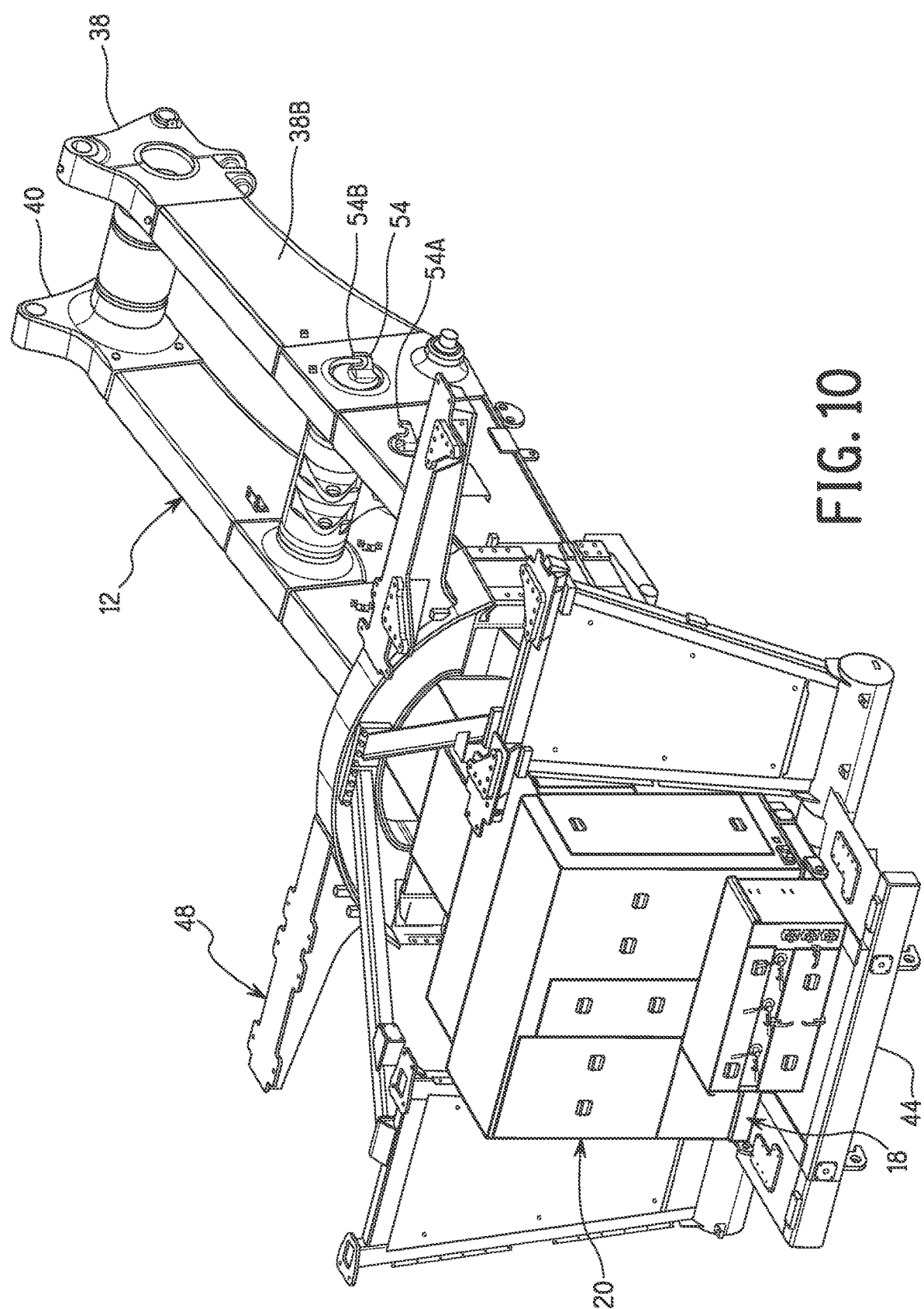
FIG. 10 is a perspective view of the battery mounted to the main frame of the work vehicle of FIG. 1.

A third mount 54 is connected to an outer surface 38B of the first longitudinally extending member 38 of the main frame 12, as shown in FIGS. 2 and 10. The third mount 54 preferably includes first and second hook members 54A and 54B rigidly connected to the outer surface 38B of the first longitudinally extending member 38. The first hook member 54A is disposed forward of the second hook member 54B. The second hook 54B is configured substantially similarly to the second hook 54A.

Another third mount 56 is connected to an outer surface 40B of the second longitudinally extending member 40 of the main frame 12, as shown in FIG. 2. The other third mount 56 preferably includes first and second hook members 56A and 56B rigidly connected to the outer surface 40B of the second longitudinally extending member 40. The first hook member 56A is disposed forward of the second hook member 56B. The second hook 56B is configured substantially similarly to the second hook 56A. A distance between the first and second hook members 54A and 54B of the third mount 54 can be different from a distance between the first and second hook members 56A and 56B of the other third mount 56, as shown in FIG. 2. Alternatively, the distance between the first and second hook members 54A and 54B of the third mount 54 can be substantially equivalent to the distance between the first and second hook members 56A and 56B of the other third mount 56.

Figure 15:
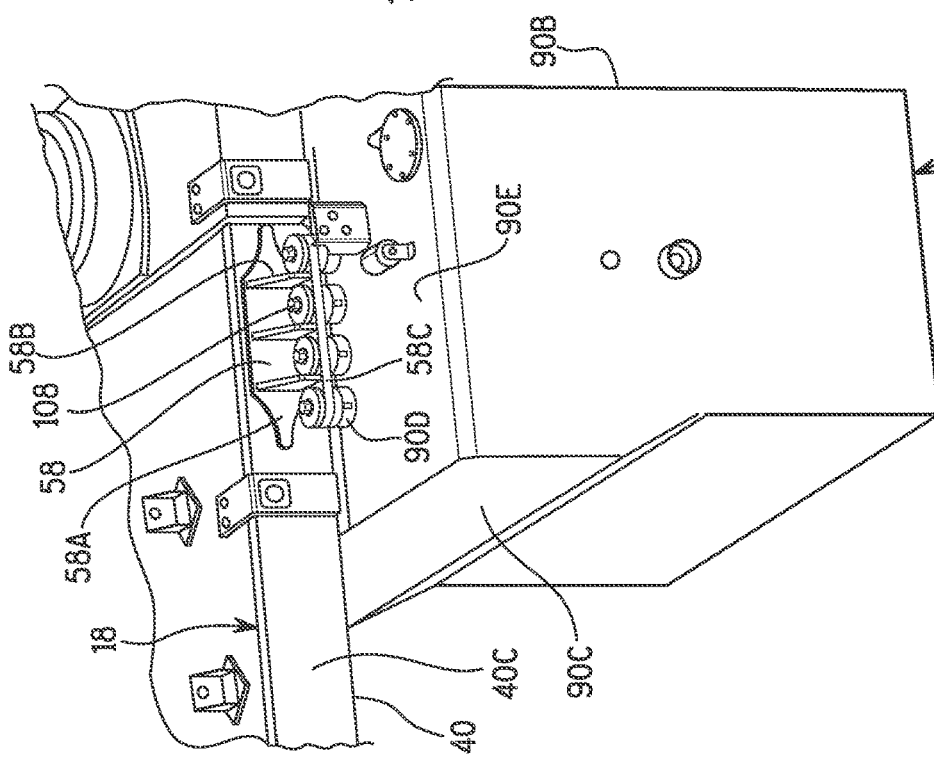
FIG. 15 is a lower perspective view of the fuel tank mounted to the main frame of FIG. 14.

A fourth mount 58 is connected to the main frame 12, as shown in FIG. 15. The fourth mount 58 is connected to the second longitudinally extending support member 40. The fourth mount 58 includes a connecting member 58A rigidly connected to the lower surface 40C of the second longitudinally extending member. A plurality of laterally extending support ribs 58B are connected to the connecting member 58A. A longitudinally extending support member 58C is connected to outer ends of the plurality of support ribs 58B. A plurality of fastener openings extend completely through the support member 58C. A central axis of the fastener openings extends in the lateral direction of the work vehicle. The fourth mount 58 is disposed between the first and second hooks 56A and 56B in the longitudinal direction of the work vehicle. Another fourth mount substantially identical to the fourth mount 48 and can be connected to the first longitudinally extending support member 38.

Figure 16:
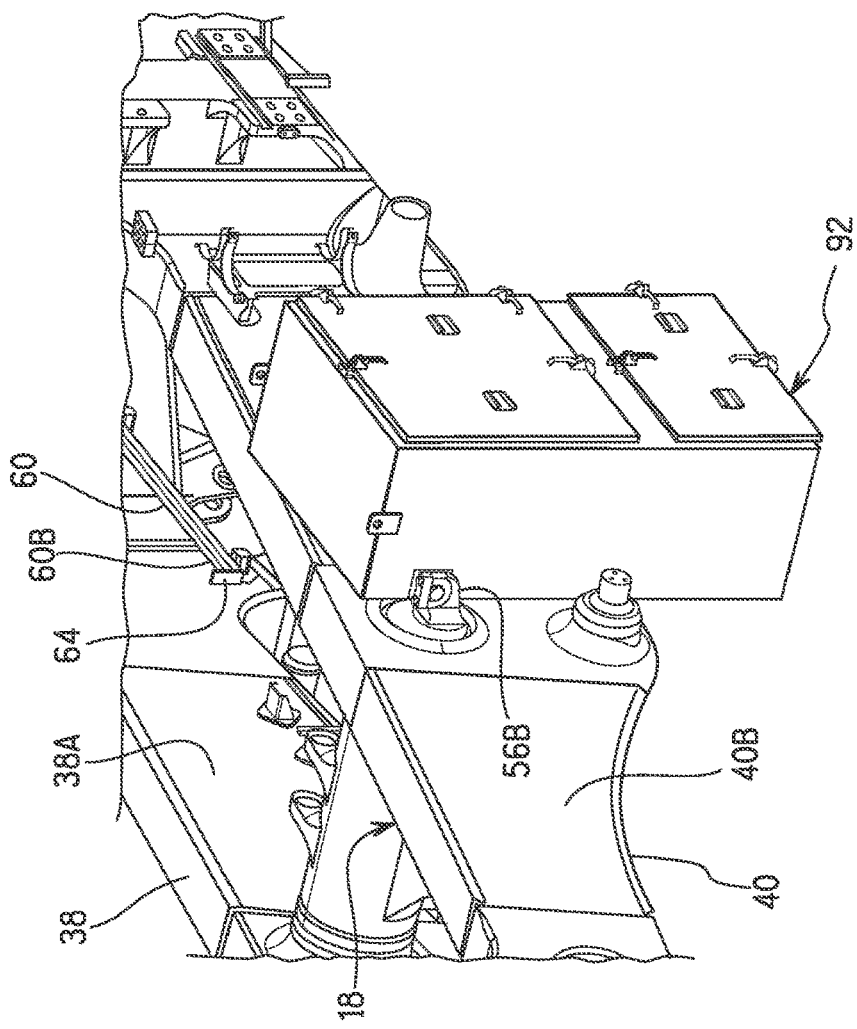
FIG. 16 is a perspective view of a contactor box of the battery mounted to the main frame of FIG. 8.

A first mounting rail 60 is connected to the inner surface 38A of the first longitudinally extending member 38 of the main frame 12, as shown in FIG. 2. The first mounting rail 60 extends from a first end 60A, as shown in FIG. 2, to a second end 60B, as shown in FIG. 16. A second mounting rail 62 is connected to the inner surface 40A of the second longitudinally extending member 40 of the main frame 12. The second mounting rail 62 extends from a first end 62A to a second end (not shown). The first and second mounting rails 60 and 62 are aligned. A stop member 64, as shown in FIG. 16, is disposed at the second ends of each of the first and second mounting rails 60 and 62. The first mount 46 of the main frame 12 is disposed forward of the first ends 60A and 62A of the first and second mounting rails 60 and 62. The second mounts 50 are disposed rearward of the second ends 60B of the first and second mounting rails 60 and 62. The third and fourth mounts 54 and 58 are disposed rearward of the second ends 60B of the first and second mounting rails 60 and 62.

The engine 16 is mounted to the engine sub-frame 14, as shown in FIG. 3. The engine 16 may be the first type of power source and the second type of power source. The engine sub-frame may be the first sub-frame and the second sub-frame.

The engine sub-frame 14 includes first and second longitudinally extending members 66 and 68, as shown in FIGS. 5 and 6. A plurality of cross members 70 extend between the first and second longitudinally extending members 66 and 68 of the engine sub-frame 14. A first mount 72 is rigidly connected to the first longitudinally extending member 66. Another first mount 72 is rigidly connected to the second longitudinally extending member 68. An upper surface 72A of each of the first mounts 72 is substantially planar. A plurality of fastener openings 72B extend from the upper surface 72A to a lower surface 72C of each of the first mounts 72. At least one fastener opening 72B is preferably disposed on an inboard side of the first longitudinally extending member 66 and at least one fastener opening is preferably disposed on an outboard side of the first longitudinally extending member 66. The first mounts 72 of the engine sub-frame are substantially identical.

A second mount 74 is rigidly connected to the first longitudinally extending member 66. Another second mount 74 is rigidly connected to the second longitudinally extending member 68. The second mounts 74 are preferably disposed on outer surfaces 66A and 68A of the first and second longitudinally extending members 66 and 68. An upper surface 74A of each of the second mounts 74 is substantially planar. A plurality of fastener openings 74B are formed in a lower surface 74C of each of the second mounts 74. The fastener openings 74B do not extend completely through to the upper surfaces 74A, as shown in FIG. 5. A recess 74D is formed in the lower surface 74C of each of the second mounts 74, as shown in FIG. 6. The recess 74D preferably has a semi-circular shape when viewed in the lateral direction of the work vehicle 10.

A roller 76 is removably attached to the first longitudinally extending member 66, as shown in FIGS. 5 and 6. Another roller 76 is removably attached to the second longitudinally extending member 68. The rollers 76 are rotatable relative to the first sub-frame 14 about a rotation axis 76A, as shown in FIG. 5.

The battery 20 is mounted to the battery sub-frame 18, as shown in FIG. 4. The battery 20 is preferably a high-voltage battery. The battery 20 may be the second type of power source.

Figure 7:
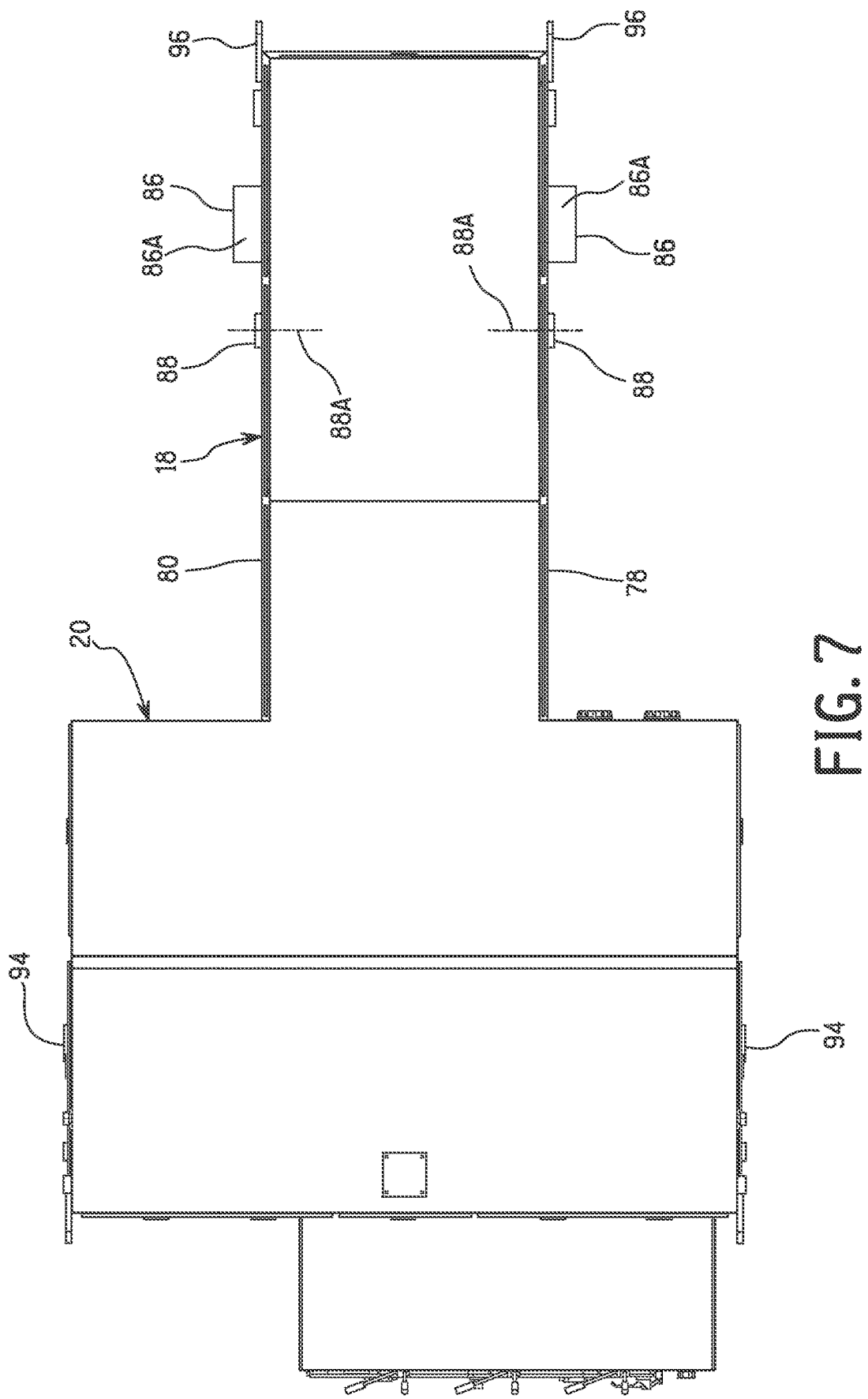
FIG. 7 is a top plan view of the battery mounted to the battery sub-frame of FIG. 4.
Figure 8:
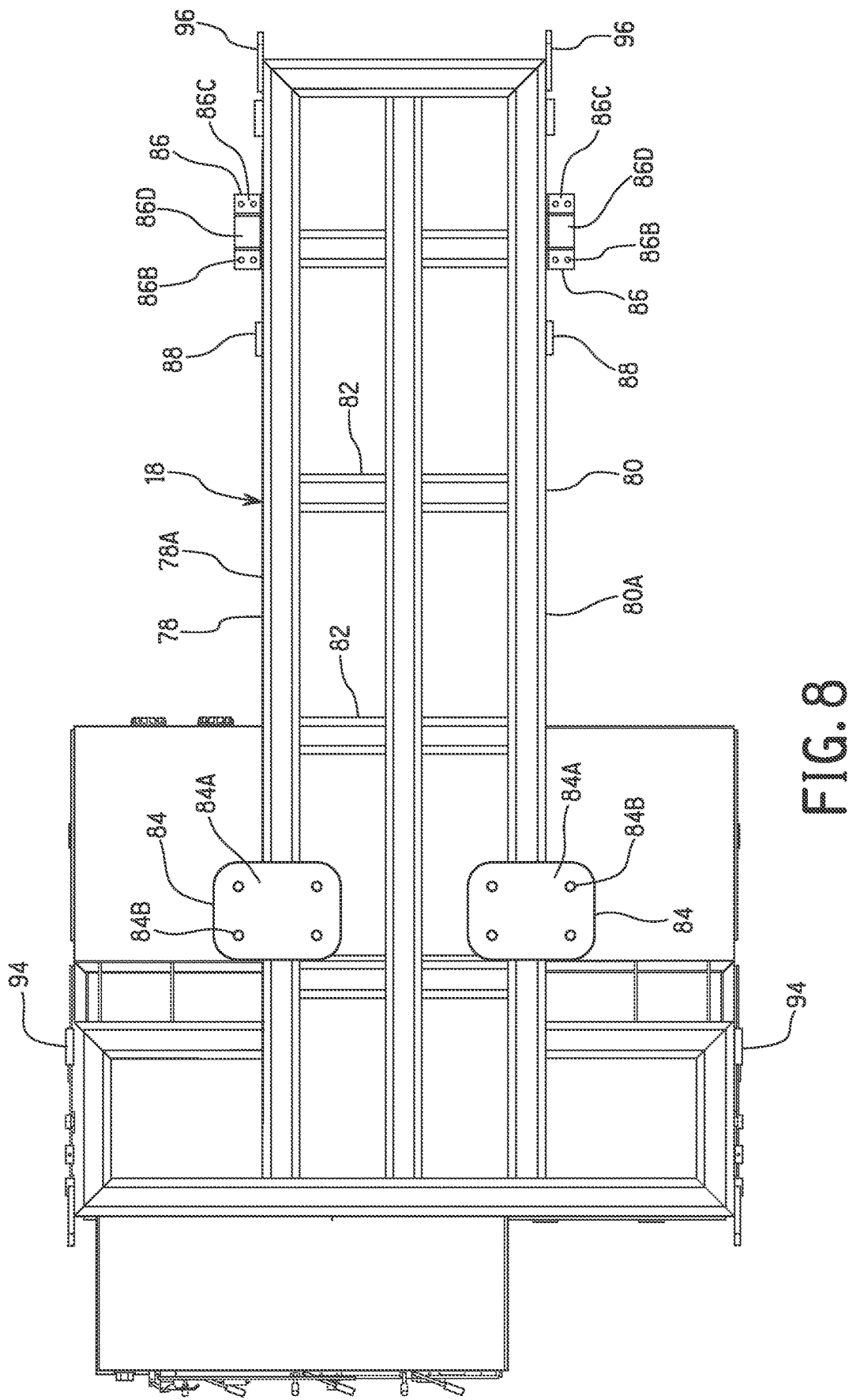
FIG. 8 is a bottom plan view of the battery mounted to the battery sub-frame of FIG. 7.
Figure 9:
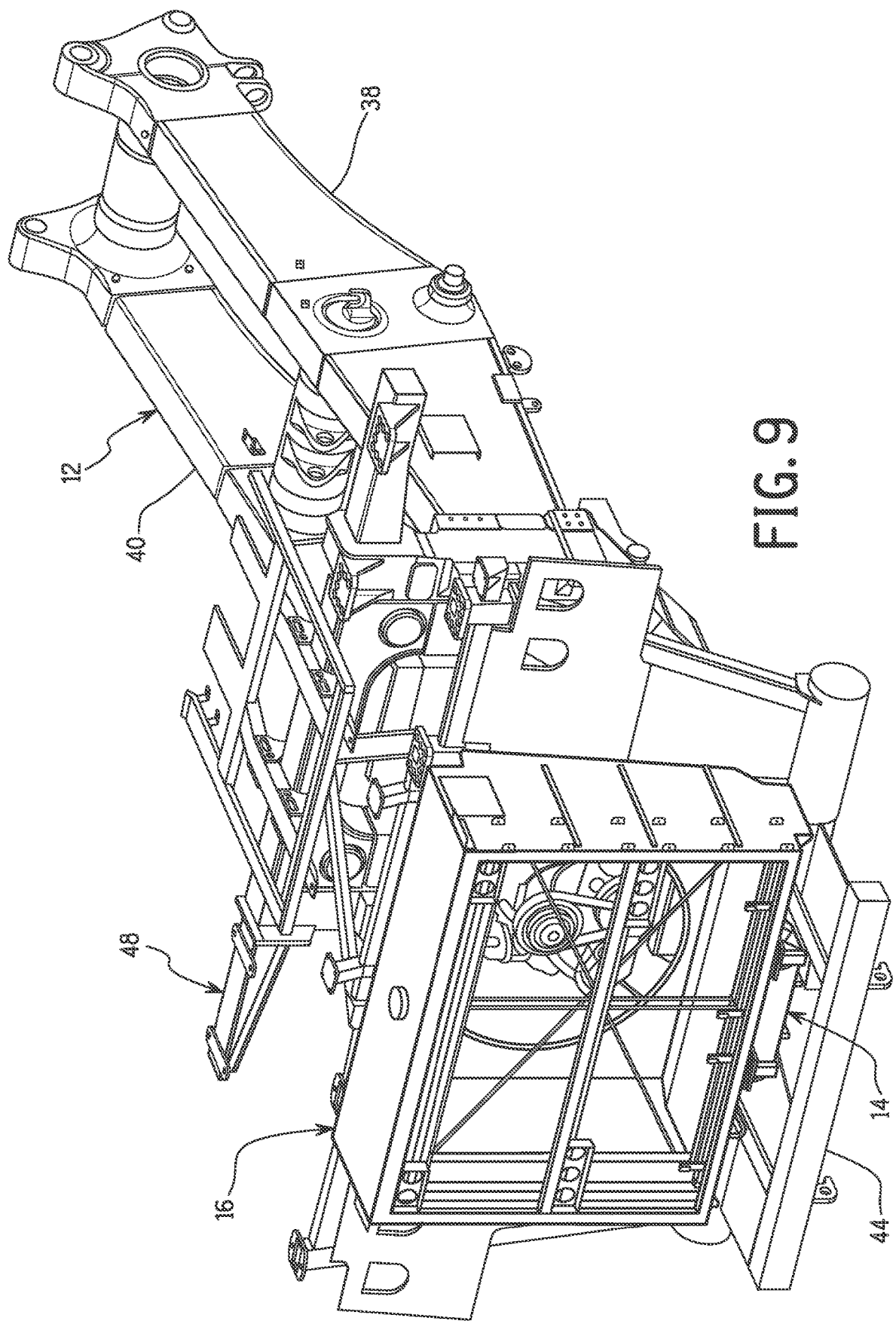
FIG. 9 is a perspective view of the engine mounted to the main frame of the work vehicle of FIG. 1.

The battery sub-frame 18 includes first and second longitudinally extending members 78 and 80, as shown in FIGS. 7 and 8. A plurality of cross members 82 extend between the first and second longitudinally extending members 78 and 80 of the battery sub-frame 18. A first mount 84 is rigidly connected to the first longitudinally extending member 78. Another first mount 84 is rigidly connected to the second longitudinally extending member 80. A lower surface 84A of each of the first mounts 84 is substantially planar. A plurality of fastener openings 84B extend from the lower surface 84A to an upper surface 84C (FIG. 12) of each of the first mounts 84. At least one fastener opening 84B is preferably disposed on an inboard side of the first longitudinally extending member 78 and at least one fastener opening 84B is preferably disposed on an outboard side of the first longitudinally extending member 78. The first mounts 84 of the battery sub-frame 18 are substantially identical.

A second mount 86 is rigidly connected to the first longitudinally extending member 78. Another second mount 86 is rigidly connected to the second longitudinally extending member 80. The second mounts 86 are preferably disposed on outer surfaces 78A and 80A of the first and second longitudinally extending members 78 and 80. An upper surface 86A of each of the second mounts 86 is substantially planar. A plurality of fastener openings 86B are formed in a lower surface 86C of each of the second mounts 86. The fastener openings 86B do not extend completely through to the upper surfaces 86A, as shown in FIG. 7. A recess 86D is formed in the lower surface 86C of each of the second mounts 86, as shown in FIG. 8. The recess 86D preferably has a semi-circular shape when viewed in the lateral direction of the work vehicle 10.

A roller 88 is removably attached to the first longitudinally extending member 78. Another roller 88 is removably attached to the second longitudinally extending member 80. The rollers 88 are rotatable relative to the battery sub-frame 18 about a rotation axis 88A, as shown in FIG. 7.

Figure 14:
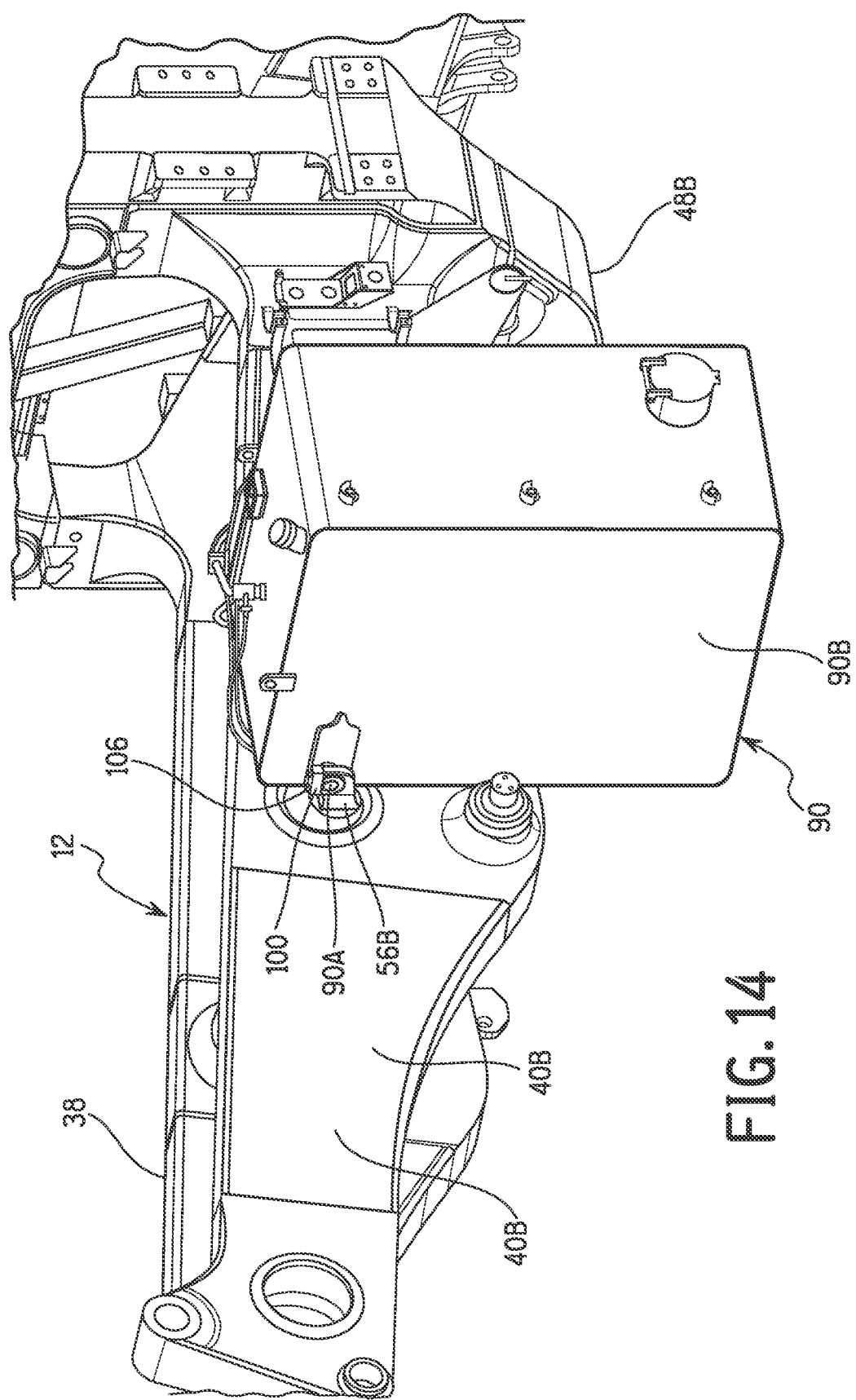
FIG. 14 is a perspective view of a fuel tank of the engine mounted to the main frame of FIG. 8.

A power source accessory is configured to be selectively mounted to the main frame 12, as shown in FIGS. 14-16. A fuel tank 90 may be the first type of power source accessory and the second type of power source accessory, as shown in FIGS. 14 and 15. A contactor box 92 may be the second type of power source accessory and the first type of power source accessory, as shown in FIG. 16. The first type of power source accessory is different from the second type of power source accessory.

The fuel tank 90 is mounted to the main frame 12 when the engine sub-frame 14 to which the engine 16 is mounted is received by the main frame 12. The fuel tank 90 stores fuel that is supplied to the engine 16 (FIG. 3). The fuel tank 90 includes a first mount 90A disposed on opposite sides 90B and 90C of the fuel tank 90. A second mount 90D is disposed on an inboard surface 90E of the fuel tank 90.

The contactor box 92 is mounted to the main frame 12 when the battery sub-frame 18 to which the battery 20 is mounted is received by the main frame 12. The contactor box 92 supplies power to the battery 20 (FIG. 4). The contactor box 92 has first and second mounts similarly configured to the first and second mounts 90A and 90D of the fuel tank 90.

The main frame 12 is configured to selectively receive one of the first sub-frame on which the first type of power source is mounted and the second sub-frame on which the second type of power source is mounted, thereby providing a modular main frame 12. The first type of power source 16 is different from the second type of power source. The one of the first and second sub-frames selectively mounted to the main frame 12 can be removed as desired, such as at a factory or in the field, and the other the first and second sub-frames can then be mounted to the main frame 12. The first and second types of power source accessories are selectively mounted to and removed from the main frame 12 in accordance with the type of power source selectively mounted to the main frame.

Figure 19:
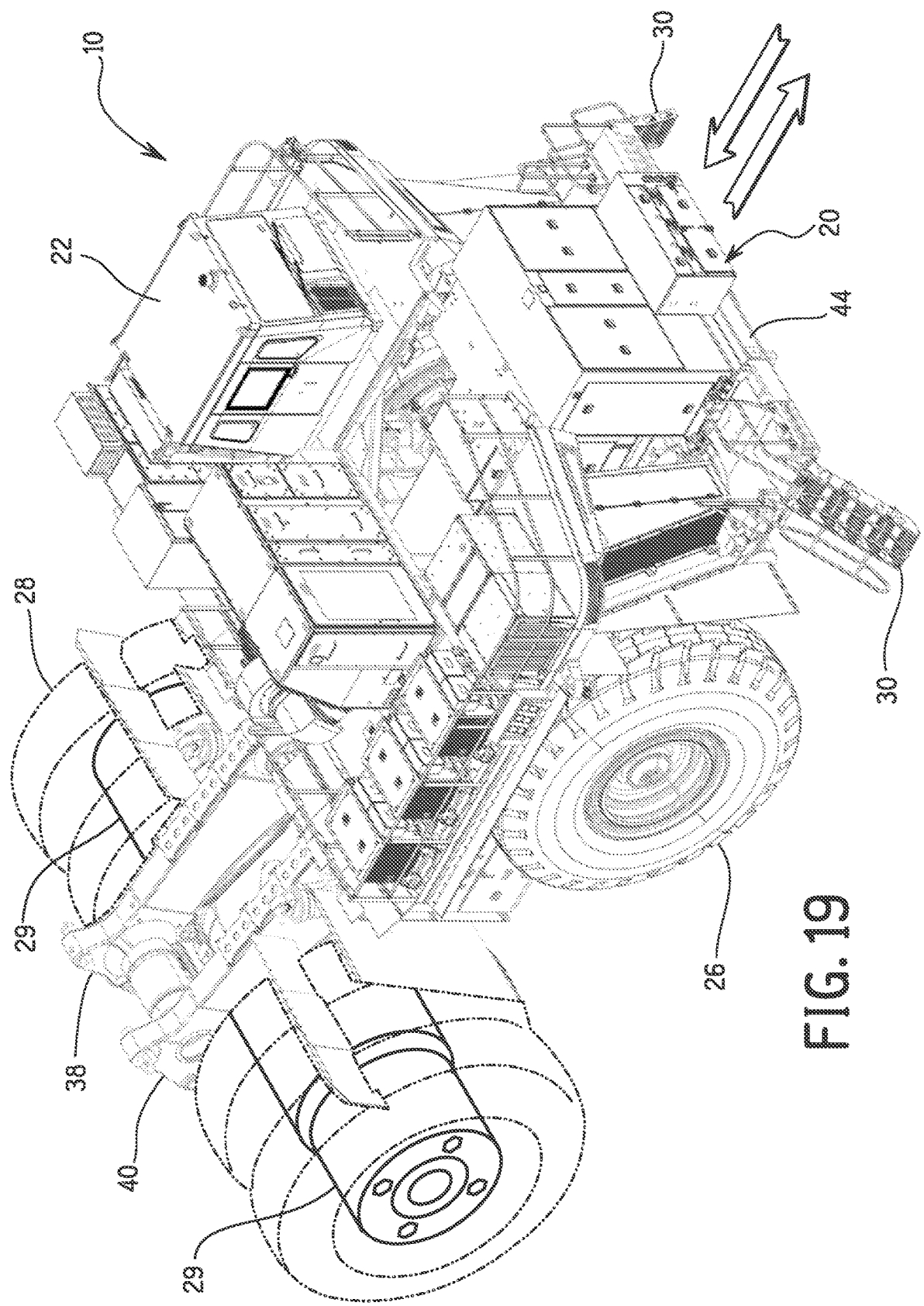
FIG. 19 is a perspective view of the work vehicle of FIG. 1 in which the type of power source is being selectively changed in the field.

The types of power sources include, but are not limited to, an engine, such as a diesel engine, a battery, and a hydrogen fuel cell. The hydrogen fuel cell may be the first type of power source, and the second type of power source. A mine operator has the flexibility to change the various types of power sources easily at a mine location, as shown in FIG. 19. The battery 20 is being mounted to the main frame 12 of the work vehicle 10 at the mine location after having removed the previous type of power source, with only requiring a partial disassembly of the work vehicle 10. A mine operator can detach the first type of power source from the work vehicle 10 and attach the second type of power source after the work vehicle has been driven a long distance with only requiring a partial disassembly of the work vehicle.

Figure 17:
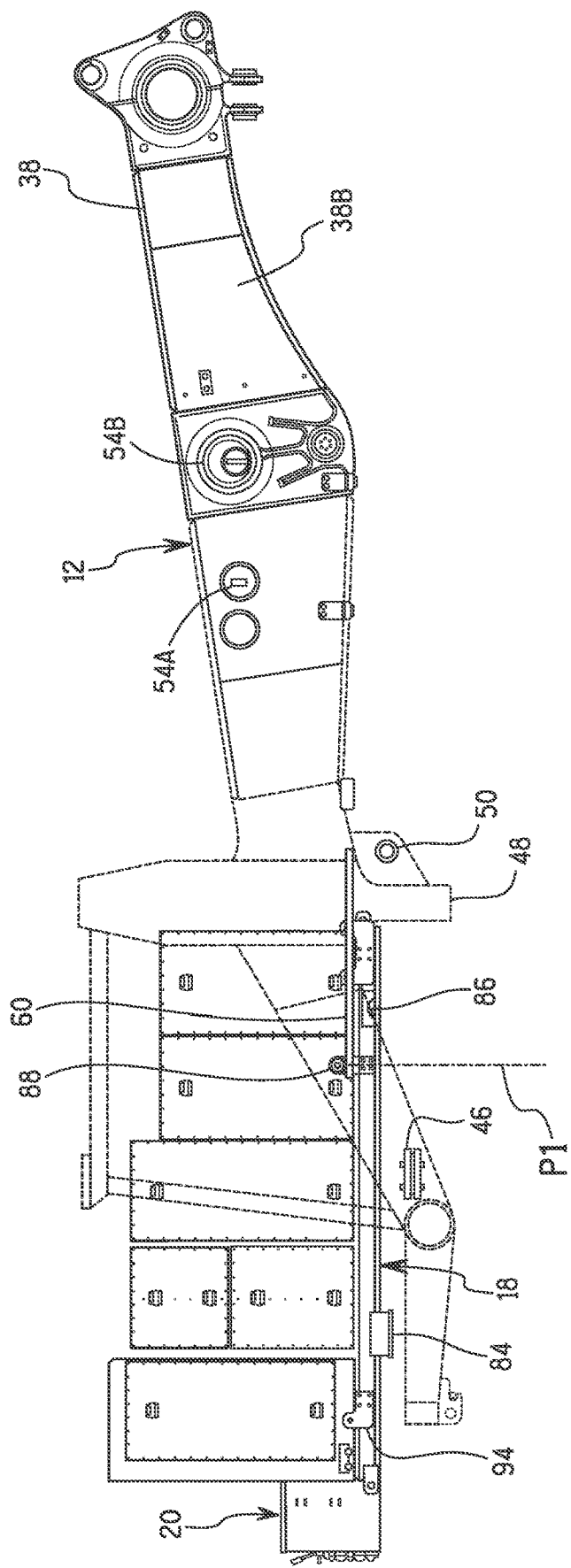
FIG. 17 is a side elevational view of the battery sub-frame disposed at a first end of a mounting rail of the main frame.
Figure 18:
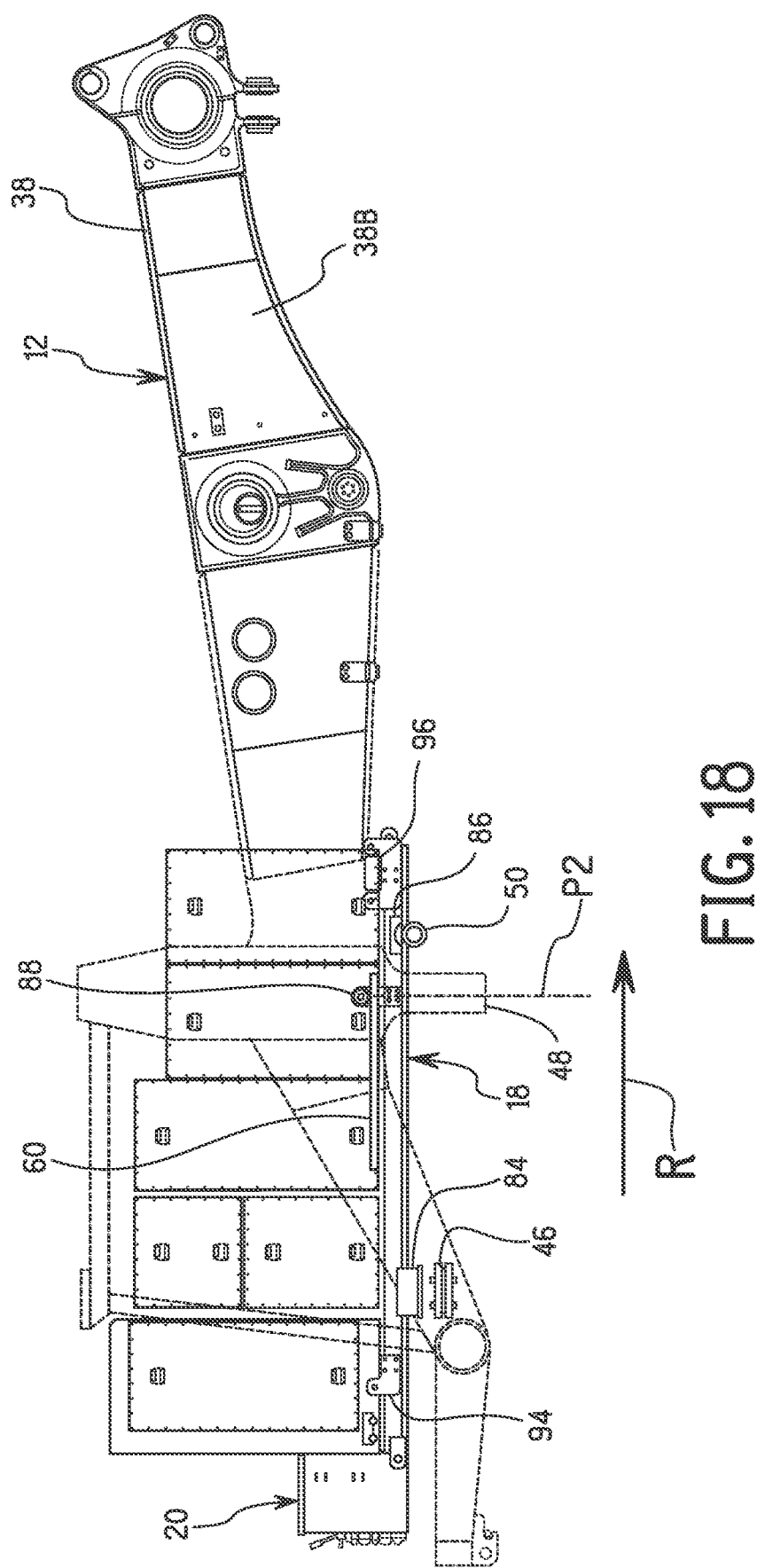
FIG. 18 is a perspective view of the battery sub-frame of the battery disposed at the second end of the mounting rail of the main frame of FIG. 17.

The battery sub-frame 18 is mounted to the main frame 12, as shown in FIGS. 17 and 18. The engine sub-frame 14 is mounted to the main frame 12 in a substantially similar manner.

Front and rear lifting points 94 and 96 are attached to each of the first and second longitudinally extending members of the battery sub-frame 18. An overhead conveying system, such as a crane, is connected to the lifting points 94 and 96 to position the battery sub-frame 18 on the first and second mounting rails 60 and 62 of the main frame 12, as shown in FIG. 17. The rollers 88 connected to battery sub-frame 18 are disposed in a first position P1 (FIG. 17) at the first ends 60A and 62A of the first and second mounting rails 60 and 62. The conveying system then moves the battery sub-frame 18 such that the rollers 88 move along the first and second mounting rails 60 and 62 of the main frame 12 to position the battery sub-frame 18 in a second position P2 (FIG. 18) in which the rollers 88 are disposed at second ends 60B of the first and second mounting rails 60 and 62, as shown in FIG. 18. The stop members 64 disposed at the second ends 60B of the first and second mounting rails 60 and 62 stop further movement of the battery sub-frame 18 in a direction away from the first position P1. In other words, the stop members 64 prevent further movement of the battery sub-frame 18 in the rearward direction R of the work vehicle 10. When the battery sub-frame 18 is disposed in the second position P2, as shown in FIG. 18, the first mounts 46 of the main frame 12 are vertically spaced from the first mounts 84 connected to the battery sub-frame 18. The second mounts 50 of the main frame 12 are vertically spaced from the second mounts 86 connected to the battery sub-frame 18 when the battery sub-frame 18 is disposed in the second position. The rollers 88 engage the first and second mounting rails 60 and 62 of the main frame 12 to facilitate guiding the battery sub-frame 18 to the second position.

When the battery sub-frame 18 is disposed in the second position, as shown in FIG. 18, the roller members 88 are removed from the battery sub-frame 18. The conveying system then lowers the battery sub-frame 18 such that the first and second mounts 84 and 88 of the battery sub-frame 18 engage the first and second mounts 46 and 50 of the main frame 12, as shown in FIGS. 11-13.

The fastener openings 84B in the first mounts 84 of the battery sub-frame 18 are aligned with the fastener openings 46B in the first mounts 46 of the main frame 12, as shown in FIGS. 11 and 12. Fasteners 98 engage the fastener openings 46B and the fastener openings 84B to secure the first mounts 46 and 84 together.

The recess 86D in the lower surface 86C of the second mount 86 of the battery sub-frame 18 engages the second mount 50 of the main frame 12, as shown in FIGS. 11 and 13. A rubber bushing (not shown) can be disposed on the second mount to receive the recess 86D of the second mount 86. A clamp 100 engages the lower surface 86C of the second mount 86, such that the second mount 50 of the main frame 12 is disposed therebetween. Fastener openings in the clamp 100 are aligned with fastener openings 86B in the second mount 86 of the battery sub-frame 18. Fasteners 102 engage the openings in the clamp 100 and the fastener openings 86B in the second mount 86 of the battery sub-frame 18 to secure the battery sub-frame 18 to the main frame 12.

When the battery sub-frame 18 is securely mounted to the main frame 12, the contactor box 92 is mounted to the main frame 12 and connected to the battery 20 to supply power thereto, as shown in FIG. 16. The contactor box 92 is connected to the main frame 12 in a substantially similar manner as the fuel tank 90, such that the following description refers to the fuel tank 90, as shown in FIGS. 14 and 15.

The first mounts 90A of the fuel tank 90 are engaged with recesses in the hooks 56A and 56B of the third mount 56 of the main frame 12, as shown in FIGS. 2 and 14. A clamp 104 engages upper surfaces of the hooks 56A and 56B such that the first mounts 90A of the fuel tank 90 are disposed therebetween. Fasteners 106 engage corresponding fastener holes in the clamp 104 and the hooks 56A and 56B to securely retain the fuel tank 90 to the main frame 12.

The second mounts 90D of the fuel tank 90 are aligned with the corresponding openings in the longitudinally extending support member 58C of the main frame 12, as shown in FIG. 15. Fasteners 108 engage corresponding fastener openings in the longitudinally extending support member 58C of the main frame 12 and the second mounts 90D of the fuel tank 90 to securely retain the fuel tank 90 to the main frame 12. The fuel tank 90 is then fluidly connected to the engine 16 to supply fuel stored in the fuel tank 90 to the engine 16.

The engine sub-frame 14 is mounted to the main frame 12 in a substantially similar manner. Front and rear lifting points 110 and 112 are connected to the engine sub-frame 14 to facilitate engaging the rollers 76 of the engine sub-frame with the first and second mounting rails 60 and 62 of the main frame 12. The first and second mounts 72 and 74 of the engine sub-frame 14 and the first and second mounts 84 and 86 of the battery sub-frame 18 are disposed in substantially similar locations such that the engine and battery sub-frames can be selectively mounted to the main frame 12. The first and second mounts of each of the fuel tank and contactor box 90 and 92 are disposed in substantially similar locations such that the fuel tank and contactor box can be selectively mounted to the main frame 12. The main frame 12 of the work vehicle 10 in accordance with exemplary embodiments of the present disclosure provides a modular main frame to which the engine and battery sub-frames 14 and 18 can be selectively mounted.

Many parts of the work machine are conventional components that are well known in the work machine field. Since these components are well known in the work machine field, these structures will not be discussed or illustrated in detail herein, except as related to the disclosure set forth in the following claims.

As used herein, the following directional terms "forward, rearward, above, downward, vertical, horizontal, below and transverse" as well as any other similar directional terms refer to those directions of a work machine on a level surface. Accordingly, these terms, as utilized to describe the present disclosure should be interpreted relative to a work machine equipped with the present disclosure. The terms of degree such as "substantially", "about" and "approximately" as used herein mean a amount of deviation of the modified term such that the end result is not significantly changed.

While only selected embodiments have been chosen to illustrate the present disclosure, it will be apparent to those skilled in the art from this disclosure that various changes and modifications can be made herein without departing from the scope of the disclosure as defined in the appended claims. Furthermore, the foregoing descriptions of the embodiments according to the present disclosure are provided for illustration only, and not for the purpose of limiting the disclosure as defined by the appended claims and their equivalents. Thus, the scope of the disclosure is not limited to the disclosed embodiments.

What is claimed is:

1. A work vehicle comprising:
   a main frame configured to selectively receive one of a first type of power source and a second type of power source at a predetermined area on the main frame, the first type of power source being different from the second type of power source and being mutually exclusive in installation at the predetermined area;
   a traction motor connected to the main frame and configured to be driven by the one of the first type of power source and the second type of power source; and
   a wheel connected to the main frame and configured to be driven by the traction motor.

2. The work vehicle according to claim 1, wherein the second type of power source is configured to be mounted to the main frame after removing the first type of power source.

3. The work vehicle according to claim 1, wherein the first type of power source is mounted on a first sub-frame, and the second type of power source is mounted on a second sub-frame, the first sub-frame and the second sub-frame being configured to be mounted to the predetermined area.

4. The work vehicle according to claim 3, wherein a roller member is removably attached to the one of the first sub-frame and the second sub-frame.

5. The work vehicle according to claim 4, wherein the roller member is configured to move between a first position and a second position on a mounting rail connected to the main frame.

6. The work vehicle according to claim 5, wherein a stop member is disposed at the second position on the mounting rail to limit further movement of the roller member in a direction away from the first position.

7. The work vehicle according to claim 6, wherein a first mount connected to the main frame is spaced from a first mount connected to the one of the first sub-frame and the second sub-frame when the roller member is disposed in the second position.

8. The work vehicle according to claim 7, wherein a second mount connected to the main frame is spaced from a second mount connected to the one of the first sub-frame and the second sub-frame when the roller member is disposed in the second position.

9. The work vehicle according to claim 8, wherein the first mount of the main frame is disposed forward of the first position of the mounting rail.

10. The work vehicle according to claim 9, wherein the second mount of the main frame is disposed rearward of the second position of the mounting rail.

11. The work vehicle according to claim 1, wherein the first type of power source is an engine.

12. The work vehicle according to claim 1, wherein the second type of power source is a battery.

13. The work vehicle according to claim 1, wherein the second type of power source is a hydrogen fuel cell.

14. The work vehicle according to claim 1, wherein the main frame is configured to selectively receive one of a first type of power source accessory and a second type of power source accessory to provide power to the one of the first power source and the second power source, the first type of power source accessory being different from the second type of power source accessory.

15. The work vehicle according to claim 14, wherein a third mount connected to the main frame is configured to receive the one of the first type of power source accessory and the second type of power source accessory.

16. The work vehicle according to claim 15, wherein a fourth mount connected to the main frame is configured to receive the one of the first type of power source accessory and the second type of power source accessory.

17. A method of manufacturing a work vehicle, the method comprising:
    mounting a first type of power source to at a predetermined area on a main frame of the work vehicle,
    removing the first type of power source from the predetermined area, and
    mounting a second type of power source to the predetermined area,
    the first type of power source being different from the second type of power source and being mutually exclusive in installation on the work vehicle.

18. The method according to claim 17, wherein the first type of power source is mounted on a first sub-frame, and the second type of power source is mounted on a second sub-frame, the first sub-frame and the second sub- frame being configured to be mounted to the predetermined area.

19. The method according to claim 18, further comprising disposing a roller of the one of the first sub-frame and the second sub-frame at a first position of a mounting rail connected to the main frame; and
    moving the one of the first sub-frame and the second sub-frame to a second position of the mounting rail.

20. The method according to claim 18, further comprising stopping further movement of the one of the first sub-frame and the second sub-frame in a direction away from the first position with a stop member.

21. The method according to claim 19, further comprising removing the roller from the one of the first sub-frame and the second sub-frame; and lowering the one of the first sub-frame and the second sub-frame to engage a first mount of the one of the first sub-frame and the second sub-frame with a first mount of the main frame.

22. The method according to claim 21, further comprising engaging a second mount of the one of the first sub-frame and the second sub-frame with a second mount of the main frame, the second mount of the main frame being disposed rearward of the first mount of the main frame in a longitudinal direction of the main frame.

23. The method according to claim 18, further comprising selectively mounting one of a first type of power source accessory and a second type of power source accessory to provide power to the one of the first type of power source and the second type of power source, the first type of power source accessory being different from the second type of power source accessory.

24. The method according to claim 23, further comprising removing the one of the first sub-frame and the second sub-frame; and
mounting the other of the first sub-frame and the second sub-frame to the main frame.

25. A main frame for a work vehicle comprising:
a first longitudinally extending member;
a second longitudinally extending member;
a plurality of cross members extending between the first and second longitudinally extending members;
a first mount connected to one of the plurality of cross members; and
a second mount connected to the first and second longitudinally extending members;
the first and second mounts being configured to selectively receive a sub-frame on which a power source is mounted.

* * * * *